United States Patent
Kim et al.

(10) Patent No.: US 9,258,167 B2
(45) Date of Patent: Feb. 9, 2016

(54) TRANSMITTING APPARATUS, RECEIVING APPARATUS AND CONTROL METHODS THEREOF

(71) Applicant: SAMSUNG ELECTRONICS CO., LTD., Suwon-si (KR)

(72) Inventors: Min-ho Kim, Suwon-si (KR); Jung-Il Han, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/621,598

(22) Filed: Feb. 13, 2015

(65) Prior Publication Data

US 2015/0229507 A1  Aug. 13, 2015

Related U.S. Application Data

(60) Provisional application No. 61/968,638, filed on Mar. 21, 2014, provisional application No. 61/939,354, filed on Feb. 13, 2014.

(30) Foreign Application Priority Data

Jul. 18, 2014 (KR) .................. 10-2014-0091214

(51) Int. Cl.
H04L 27/28 (2006.01)
H04L 27/26 (2006.01)

(52) U.S. Cl.
CPC ........ *H04L 27/2692* (2013.01); *H04L 27/2646* (2013.01); *H04L 27/2666* (2013.01); *H04L 27/2691* (2013.01); *H04L 27/2695* (2013.01)

(58) Field of Classification Search
USPC ......... 375/260, 285, 295–296, 316, 340, 342, 375/346, 348, 365; 370/210, 503, 512
See application file for complete search history.

(56) References Cited

U.S. PATENT DOCUMENTS

| | | | |
|---|---|---|---|
| 7,072,289 B1 | 7/2006 | Yang et al. | |
| 7,937,741 B2 | 5/2011 | Guo et al. | |

(Continued)

FOREIGN PATENT DOCUMENTS

| | | |
|---|---|---|
| EP | 2334020 B1 | 3/2013 |
| KR | 10-2004-0035287 A | 4/2004 |
| KR | 10-2006-0046677 A | 5/2006 |
| KR | 10-2007-0024298 A | 3/2007 |
| KR | 10-2010-0003209 A | 1/2010 |
| KR | 10-2014-0006269 A | 1/2014 |

OTHER PUBLICATIONS

Steendam, et al.; "Different Guard Interval Techniques for OFDM: Performance Comparison," Springer Multi-Carrier Spread Spectrum (MC-SS), May 2007, 14 pages total.

(Continued)

*Primary Examiner* — Khanh C Tran
(74) *Attorney, Agent, or Firm* — Sughrue Mion, PLLC

(57) ABSTRACT

A transmitting apparatus is disclosed. The transmitting apparatus includes a preamble symbol inserter configured to insert to a frame a preamble symbol including a signaling information, a guard interval inserter configured to insert guard intervals to both ends of the preamble symbol, and a transmitter configured to transmit a frame including the preamble symbol and the guard intervals, wherein one of the guard intervals which are inserted to both ends of the preamble symbol comprises a pseudo random noise (PN) sequence and another guard interval includes one between the PN sequence and a part of the signaling information. Accordingly, no separate algorithm to estimate size of FFT of the preamble symbol and the guard interval is necessary, robust signal detection and synchronization is enabled by the PN sequence inserted to the guard interval, and compensation of interference which is generated under multipath channel environment deems to be easier.

18 Claims, 24 Drawing Sheets

(56) References Cited

U.S. PATENT DOCUMENTS

| | | | |
|---|---|---|---|
| 8,433,007 B2 | 4/2013 | Xiang et al. | |
| 2003/0031121 A1* | 2/2003 | Sudo | 370/203 |
| 2005/0163244 A1* | 7/2005 | Seto et al. | 375/267 |
| 2007/0171876 A1* | 7/2007 | Malik et al. | 370/336 |
| 2009/0010361 A1 | 1/2009 | Yang | |
| 2009/0135977 A1* | 5/2009 | Sheu | 375/371 |
| 2009/0297162 A1* | 12/2009 | Kai et al. | 398/135 |

OTHER PUBLICATIONS

ETSI EN 300 744 v1.2.1, "Digital Video Broadcasting (DVB); Framing structure, channel coding and modulation for digital terrestrial television", European Standard, Jul. 1999, 49 pages total.

ETSI EN 302 755 v1.3.1, "Digital Video Broadcasting (DVB); Framing Structure, channel coding and modulation for a second generation digital terrestrial television broadcasting system (DVB-T2)", European Standard, Apr. 2012, 188 pages total.

ETSI EN 302 744 v1.5.1, "Digital Video Broadcasting (DVB); Framing Structure, channel coding and modulation for digital terrestrial television", European Standard, Jun. 2004, 64 pages total.

International Search Report dated May 27, 2015, issued by the International Searching Authority in counterpart International Patent Application No. PCT/KR2015/001311.

Written Opinion dated May 27, 2015, issued by the International Searching Authority in counterpart International Patent Application No. PCT/KR2015/001311.

* cited by examiner

TRANSMITTING APPARATUS, RECEIVING APPARATUS AND CONTROL METHODS THEREOF

CROSS-REFERENCE TO RELATED APPLICATIONS

This application claims priority from Korean Patent Application No. 10-2014-0091214, filed on Jul. 18, 2014, in the Korean Intellectual Property Office, U.S. Provisional Application No. 61/968,638, filed on Mar. 21, 2014, U.S. Provisional Application No. 61/939,354, filed on Feb. 13, 2014, the disclosures of which are incorporated herein by reference in their entirety.

BACKGROUND

1. Field

Apparatuses and methods consistent with exemplary embodiments relate to a transmitting apparatus, a receiving apparatus, and control methods thereof, and more particularly, to a transmitting apparatus and a receiving apparatus which use an orthogonal frequency division multiplexing (OFDM) scheme, and control methods thereof.

2. Description of the Related Art

In recent years, broadcasting communication service has been characterized by a multifunction, wideband, and high quality. In particular, with development of electronic technology, a high-end broadcasting receiving apparatus such as a high-definition digital television (HDTV) and mobile or portable devices such as a smartphone have been increasingly spread, and thus demands on various broadcasting signal receiving methods or supports for various broadcasting services have also been growing.

As one example to meet such demands, broadcasting communication standards such as the Digital Video Broadcasting the Second Generation European Terrestrial (DVB-T2) have been developed. The DVB-T2 is currently employed in 35 countries or more in the whole world including Europe. The DVB-T2 realizes increase in transmission capacity and high bandwidth efficiency by applying the latest technology such as a low density parity check (LDPC) coding method, a 256 quadrature amplitude modulation (QAM) method, or the like, and thus the DVB-T2 may provide various services of high quality in a limited band such as an HDTV.

The T2 frame which is used for the DVB-T2 overcomes a problem that a large amount of signaling information is redundantly inserted to all the symbols by using one P1 symbol and a plurality of P2 symbols which include signaling information.

However, even though signal detection is successful by the P1 symbol, a size of a guard interval which is information required to decode the P2 symbols is still unknown, and thus, a separate algorithm to estimate the size of the guard interval is required.

Thus, there is a need of for a structure of a preamble symbol which includes a large amount of signaling information and enables a robust synchronization operation and channel estimation.

SUMMARY

Exemplary embodiments may overcome the above disadvantages and other disadvantages not described above. However, it is understood that the exemplary embodiment are not required to overcome the disadvantages described above, and may not overcome any of the problems described above.

The exemplary embodiments are related to a transmitting apparatus and a receiving apparatus which inserts guard intervals including a preset sequence at both ends of a preamble symbol, and a controlling method thereof.

According to an exemplary embodiment, there is provided a transmitting apparatus which may include: a preamble symbol inserter configured to insert in a frame a preamble symbol comprising signaling information; a guard interval inserter configured to insert a plurality of guard intervals in both ends of the preamble symbol, respectively; and a transmitter configured to transmit a frame comprising the preamble symbol and the guard intervals, wherein one of the guard intervals comprises a pseudo random noise (PN) sequence and another guard interval comprises one of the PN sequence and a part of the signaling information.

A guard interval which is inserted in a front end of the preamble symbol may include the PN sequence, and a guard interval which is inserted in a back end of the preamble symbol comprises one of the PN sequence and the part of the signaling information.

The guard interval inserter may be further configured to generate the PN sequence which is a same size as a size of the preamble symbol and insert a part of the generated PN sequence to each of the guard intervals, or insert different parts of the generated PN sequence to the guard intervals, respectively.

The guard interval inserter may be further configured to generate a PN sequence having a predetermined size, and insert the generated PN sequence in the preamble symbol.

The generated PN sequence may have a same size as the preamble symbol, and the guard interval may be further configured to scale down the generated PN sequence to the predetermined size, and insert the scaled down PN sequence in the preamble symbol.

A size or a fast Fourier transform (FFT) size of the preamble symbol may be 8 K, and a size of the PN sequence included in each of the guard intervals may be 3648 samples.

According to another exemplary embodiment, there is provided a receiving apparatus which may include: a receiver configured to receive a data symbol, a preamble symbol comprising signaling information and a plurality of guard intervals inserted in both ends of the preamble symbol, wherein one of the guard intervals comprises a PN sequence and another guard interval comprises one of the PN sequence and a part of the signaling information; a synchronizer configured to compensate the preamble symbol and perform synchronization based on the PN sequence included in the guard intervals; a channel estimator configured to perform channel estimation based on the compensated preamble symbol; a compensator configured to compensate inter carrier interference/inter symbol interference (ICI/ISI) based on at least one of the part of the signaling information and the PN sequence included in the guard intervals; and a signal processor configured to detect the signaling information from an output of the channel estimator and the compensator, and process the data symbol included in the frame based on the detected signaling information.

The synchronizer, based on the PN sequence, may be configured to estimate a frequency offset and a sampling offset, compensate the preamble symbol and perform synchronization based on the estimated frequency offset and sampling offset.

A guard interval which is inserted in a front end of the preamble symbol may include the PN sequence and a guard interval which is inserted in a back end of the preamble symbol comprises one of the PN sequence and a part of the signaling information.

The compensator, if each of the guard intervals comprises the PN sequence, may be configured to remove the PN sequence which acts as an interference signal, and compensate the ICI/ISI using a part of the signaling information which constitutes the preamble symbol.

A size or an FFT size of the preamble symbol may be 8 K, and a size of the PN sequence may be 3648 samples.

According to still another exemplary embodiment, there is provided a method of controlling a transmitting apparatus which may include: inserting in a frame a preamble symbol comprising signaling information; inserting a plurality of guard intervals in both ends of the preamble symbol; and transmitting a frame comprising the preamble symbol and the guard intervals, wherein one of the guard intervals comprises a PN sequence and another guard interval comprises one of the PN sequence and a part of the signaling information.

A guard interval which is inserted in a front end of the preamble symbol may include a PN sequence and a guard interval which is inserted in a back end of the preamble symbol may include one of the PN sequence and a part of the signaling information.

The inserting the guard interval may include: generating a PN sequence which is a same size as a size of the preamble symbol; and inserting a part of the generated PN sequence to each of the guard intervals, or inserting different parts of the generated PN sequence to the guard intervals, respectively.

The method may further include: generating a PN sequence having a predetermined size; and inserting the generated PN sequence in the preamble symbol.

The generated PN sequence may have a same size as the preamble symbol, and the method may further include: scaling down the generated PN sequence to the predetermined size; and inserting the scaled down PN sequence in the preamble symbol.

A size or an FFT size of the preamble symbol may be 8 K, and a size of the PN sequence included in each of the guard intervals may be 3648 samples.

According to still another exemplary embodiment, there is provided a controlling method of a receiving apparatus which may include: receiving a frame which comprises a data symbol, a preamble symbol comprising signaling information and a plurality of guard intervals inserted in both ends of the preamble symbol, wherein one of the guard intervals comprises a PN sequence and another guard interval comprises one of the PN sequence and a part of the signaling information; compensating the preamble symbol and performing synchronization based on the PN sequence included in the guard intervals; performing channel estimation based on the compensated preamble symbol; compensating ICI/ISI based on at least one of a part of the signaling information and the PN sequence included in the guard intervals; and detecting the signaling information from the preamble symbol on which the channel estimation and the ICI/ISI compensation are performed and processing the data symbol included in the frame based on the detected signaling information.

The performing synchronization may include: estimating a frequency offset and a sampling offset based on the PN sequence; and compensating the preamble symbol and performing synchronization based on the estimated frequency offset and sampling offset.

A guard interval which is inserted in a front end of the preamble symbol may include the PN sequence, and a guard interval which is inserted in a back end of the preamble symbol comprises one of the PN sequence and a part of the signaling information.

As described above, according to various exemplary embodiments, an additional algorithm to estimate an FFT size of a preamble symbol and a size of guard intervals is not necessary, robust signal detection and synchronization by the PN sequence inserted to guard intervals, and it becomes easy to compensate interference which is generated under a multipath channel environment.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
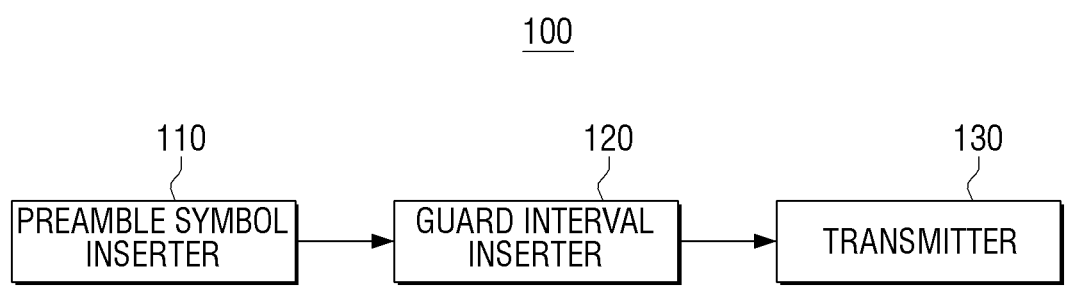
FIG. 1 is a block diagram illustrating a configuration of a transmitting apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a transmitting apparatus according to an exemplary embodiment.

According to FIG. 1, a transmitting apparatus 100 includes a preamble symbol inserter 110, a guard interval inserter 120, and a transmitter 130.

The preamble symbol inserter 110 inserts into a frame a preamble symbol which includes signaling information. Here, the signaling information includes at least one parameter which is required to decode a data symbol, which will be explained later in greater detail. In addition, before the preamble symbol inserter 110 inserts the preamble symbol into the frame, the frame is generated by a structure (not illustrated) which constitutes an Advanced Television Systems Committee (ATSC) 3.0 system, which will be explained also later in detail.

The guard interval inserter 120 inserts guard intervals at both ends of a preamble symbol. Here, the guard interval indicates a section which is inserted to prevent interference between adjacent signals or symbols. Depending on a size of fast Fourier transform (FFT) which can be 8 K, 16 K or 32 K, a size of a guard interval may be different. However, a size of a preamble symbol may be fixed to a preset value according to an exemplary embodiment, and accordingly the guard interval inserter 120 may insert guard intervals, each having a fixed size, into both ends of a preamble symbol.

One of the guard intervals which are inserted in both ends of a preamble symbol may include a pseudo random noise (PN) sequence, and the other guard interval may include one of a PN sequence and a part of signaling information included in a preamble symbol.

In other words, each of the guard intervals which are inserted in both ends of the preamble symbol may include a PN sequence, or one of the guard intervals which are inserted in both ends of the preamble symbol may include a PN sequence, and the other may include one of a PN sequence and a part of signaling information included in the preamble symbol.

The transmitter 130 transmits a frame which includes the preamble symbol and the guard intervals. The above-described preamble symbol inserter 110, the guard interval inserter 120, and the transmitter 130 may be included in a structure (not illustrated) and an OFDM waveform generator (not illustrated) of an ATSC 3.0 system which will be explained below.

Figure 2:
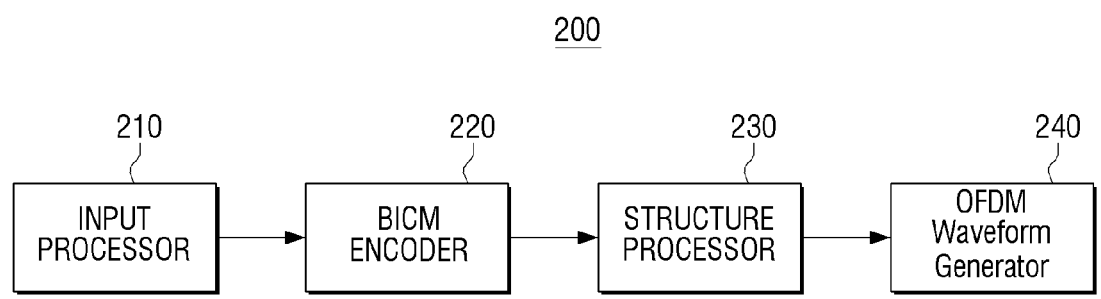
FIG. 2 is a block diagram illustrating a configuration of an Advanced Television Systems Committee (ATSC) 3.0 system according to an exemplary embodiment.

FIG. 2 is a block diagram illustrating a configuration of an ATSC 3.0 system according to an exemplary embodiment.

Referring to FIG. 2, an ATSC 3.0 system 200 may include an input processor 210, a bit interleaved and coded modulation (BICM) encoder 220, a structure processor 230, and a transmitter 240.

The input processor 210 divides a plurality of input streams into a plurality of baseband frames. Specifically, the input processor 210 outputs at least one physical layer pipe (PLP) which includes the plurality of baseband frames.

As an exemplary embodiment, a DVB-T2 system adopts a PLP concept to provide a variety of broadcasting services having different modulation methods, different channel coding rates, different time and cell interleaving lengths, or the like through one broadcasting channel.

The PLP means a signal path independently processed. That is, a variety of services (for example, video, extended video, audio, a data stream, or the like) may be transmitted and/or received through a plurality of radio frequency (RF) channels, and the PLP is a path through which the service is transmitted or a stream which is transmitted through the path. Further, the PLP may be located in slots distributed at time intervals on the plurality of RF channels, or the PLP may be distributed on one RF channel at time intervals. That is, the PLP may be distributed on one RF channel or a plurality of RF channels at time intervals and transmitted.

The PLP structure is configured of an input mode A for providing one PLP and an input mode B for providing a plurality of PLPs. In particular, when the input mode B is supported, a robust specific service may be provided, and also, one stream is transmitted in a distributed manner. Thus, a time interleaving length may be increased and a time diversity gain may be obtained. Further, when only a specific stream is received, a receiving apparatus may be powered off while a different stream is received to reduce power consumption. Thus it may be suitable for broadcasting services directed to portable, mobile devices.

Herein, time diversity indicates that a same signal is transmitted at certain time intervals several times at a transmission side to suppress deterioration of transmission quality, and these signals are synthesized again at a reception side so that good transmission quality is obtained.

Information to be commonly transmitted in a plurality of PLPs may be included in one PLP and transmitted to increase transmission efficiency. PLP0 may perform this function, and may be referred to as a common PLP. The remaining PLPs other than PLP0 which may be used to transmit data may be referred to as a data PLP.

When these PLPs are used, an HDTV service may be received at a fixed device at home, and a standard definition television (SDTV) service for a same program may be provided to a portable, mobile device on the move. Further, a variety of broadcasting services may be provided to a viewer through a broadcasting station or a broadcasting content provider, and also, such services may be received in a fringe area.

That is, the input processor 110 maps data to be transmitted with at least one signal processing path to generate a baseband frame, and performs signal processing with respect to each path. For example, the signal processing may include at least one process among input signal synchronization, delay compensation, null packet deletion, cyclic redundancy check (CRC) encoding, header insertion, coding, interleaving, and modulation. Later, the signal-processed baseband frame with respect to the paths is generated as one transmission frame together with signaling information, and the generated transmission frame is transmitted to a receiving apparatus (not shown).

The BICM encoder 220 performs forward error coding (FEC), performs constellation mapping and interleaving on the plurality of baseband frames, and outputs the plurality of interleaved baseband frames.

Specifically, when a plurality of randomized baseband frames are input to the BICM encoder 220, the plurality of baseband frames are encoded into a Bose, Chaudhuri and Hochquenghem (BCH) code, and then encoded into a low density parity check (LDPC) code. The plurality of encoded baseband frames are interleaved through a bit interleaver, and the interleaved bits are mapped with constellation symbols according to a constellation size of quadrature phase shift keying (QPSP), 16-QPSK, or higher QAM. A plurality of frames generated in this manner may be referred to an forward error correction (FEC) frame. Then, the FEC frame is time-interleaved.

The structure processor 230 adds signaling information to the plurality of baseband frames output from the BICM encoder 220 to generate an OFDM symbol.

Specifically, the structure processor 230 schedules the time-interleaved baseband frames to a stream of a data cell. Then, data cells are interleaved on a frequency domain. ATSC 3.0 frames are generated from the data cells interleaved on the frequency domain. Next, physical layer signaling called an L1 signaling is inserted into a starting point of each ATSC 3.0 frame as a preamble symbol having an 8 K, FFT size. The L1 signaling is used for fast synchronization of each frame.

The preamble symbol inserter 110 of FIG. 1 may be included in the above-described structure processor 230, and signaling information included in the preamble symbol may be an L1 signaling.

In addition, the preamble symbol inserter 110 may insert the preamble symbol which includes L1 signaling information to a starting point of an ATSC 3.0 frame which is generated in the structure processor 230.

Thereafter, the OFDM waveform generator 240 performs an inverse FFT (IFFT) operation of the ATSC 3.0 frame to which the preamble symbol is inserted, and converts to a signal on a time domain. The OFDM waveform generator 240, in order to avoid interference among symbols, inserts guard intervals to each symbol and generates a baseband analog signal by performing digital to analog conversion with respect to a signal on a time domain, and transmits the signal.

In particular, the OFDM waveform generator 240, generally based on an FFT size and a guard interval fraction, selects at least one from among a plurality of pilot patterns, inserts a pilot into an OFDM symbol according to the selected pilot pattern, and transmits a stream which includes the OFDM symbol to which the pilot is inserted.

The OFDM waveform generator 240 inserts into an ATSC 3.0 frame a continuous pilot and a scattered pilot along with data cells. Accordingly, a receiving apparatus (not illustrated) may perform channel estimation using a pilot and correct a frequency offset. A reserved tone to reduce a peak to average power ratio (PAPR) may be inserted selectively.

To be specific, various cells inserted into the ATSC 3.0 frame are modulated to reference information which is known to a receiving apparatus. Information which is transmitted by these cells has formats such as dispersion, continuation, edge, frame-start or frame-closing pilots.

The guard interval inserter 120 and the transmitter 130 of FIG. 1 may be included in the above-described OFDM waveform generator 240. Meanwhile, the guard interval inserter 120 may insert guard intervals having a fixed size into both ends of a preamble symbol which has a preset size.

At least one of the guard intervals which are inserted in both ends of the preamble symbol by the guard interval inserter 120 includes a PN sequence, and it is not necessary that a separate pilot signal for channel estimation be inserted to the preamble symbol.

Here, the pseudo random noise (PN) sequence indicates a sequence which has characteristics similar to a random noise and has a certain rule, and this is frequently used for mobile communication with spread spectrum communication. This PN sequence should be able to easily generate a long size sequence at a PN generator and rapidly perform initial synchronization in a standpoint of a mobile communication terminal.

In other words, the PN has a feature that it can be used as an identifier, and accordingly, when the PN sequence is inserted into guard intervals which are present at both ends of the preamble symbol, a receiving apparatus (not illustrated) may detect a preamble symbol, use the PN sequence for synchronization of the detected preamble symbol and channel estimation. As a result, it is not necessary that an additional pilot signal for channel estimation is inserted into a preamble symbol.

In addition, if a pilot signal is not inserted into the preamble symbol, a section where signaling information may be stored can grow further. For example, compared to a P2 symbol of DVB-T2 which includes a pilot signal which is inserted with an interval of Dx=3, the section for storing signaling information can grow by up to 30 percent.

Accordingly, the guard interval inserter 120 may improve data transmission efficiency by inserting the guard intervals including the PN sequence to at least one of the both ends of the preamble symbol.

Figure 3:
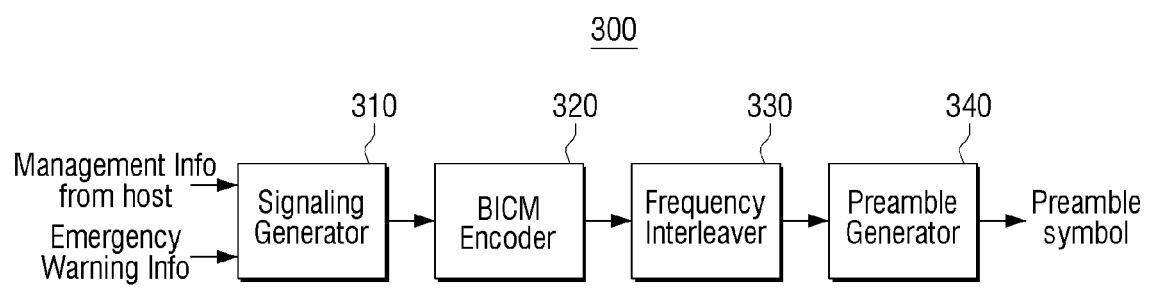
FIG. 3 is a block diagram illustrating a configuration of a signaling generation apparatus used by an ATSC 3.0 system according to an exemplary embodiment.

FIG. 3 is a block diagram illustrating a configuration of a signaling generation apparatus used by an ATSC 3.0 system, according to an exemplary embodiment.

Referring to FIG. 3, a signaling generation apparatus 300 includes a signaling generator 310, a signaling BICM encoder 320, a frequency interleaver 330 and a preamble generator 340.

The signaling generator 310 generates all signaling information which is required for a receiving apparatus (not illustrated) to decode various types of PLPs included in a data symbol region. In addition, the signaling generator 310 may insert data related to emergency warning system (EWS) to signaling information. Further, the receiving apparatus (not illustrated) may detect data on EWS by simply processing a preamble symbol.

The signaling BICM encoder 320 and the frequency interleaver 330 interleaves generated signaling information in a bit unit and in a frequency unit, respectively, and the preamble generator 340 generates and outputs a preamble symbol which includes the interleaved signaling information.

Figure 4:
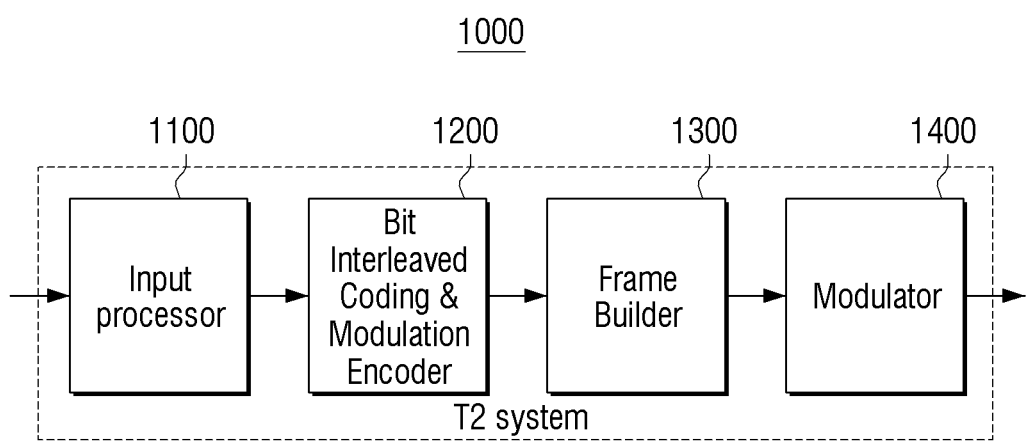
FIG. 4 is a block diagram to describe a configuration of a DVB-T2 system according to an exemplary embodiment.

FIG. 4 is a block diagram illustrating a configuration of a DVB-T2 system, according to an exemplary embodiment.

Referring to FIG. 4, a DVB-T2 transmission system 1000 may include an input processor 1100, a BICM encoder 1200, a frame builder 1300, and a modulator 1400.

The configuration of the DVB-T2 transmission system 1000 will be schematically described in that the configuration is the same as that described in the DVB-T2 which is one of European digital broadcasting standards. Details may be referred to from the "Digital Video Broadcasting (DVB); Frame structure channel coding and modulation for a second generation digital terrestrial television broadcasting system (DVB-T2)."

The input processor 1100 generates baseband frames from an input stream with respect to data to be serviced. Here, the input stream may be an MPEG-2 transport stream (TS), a generic stream (GS), or the like.

The BICM encoder 1200 performs encoding by determining an FEC coding rate and a constellation order according to a region (a fixed PHY frame or a mobile PHY frame) to which data to be serviced is to be transmitted. Signaling information for the data to be serviced may be encoded through a separate BICM encoder (not illustrated) or to be encoded through the BICM encoder 1200 which processes the data to be serviced.

The frame builder 1300 and the modulator 1400 determine an OFDM parameter for a signaling region and an OFDM parameter for a data region, to which the data to be serviced is to be transmitted, to constitute a frame, add a sync region to the constituted frame, and generates the frame. Next, modulation for modulating the generated frame to a radio frequency (RF) signal is performed, and the RF signal is transmitted to a receiving apparatus (not shown).

As described in FIG. 2, the input processor 210, BICM encoder 220, the structure processor 230, and the OFDM waveform generator 240 which constitute the ATSC 3.0 system 200 may correspond to the input processor 1100, the BICM encoder 1200, the frame builder 1300, and the modulator 1400 of FIG. 4, respectively. Likewise, the operations performed by the preamble symbol inserter 110 as in FIG. 1 may be performed by the frame builder 1300, and the operations performed by the guard interval inserter 120 and the transmitter 130 may be performed by the modulator 1400.

Figure 5:
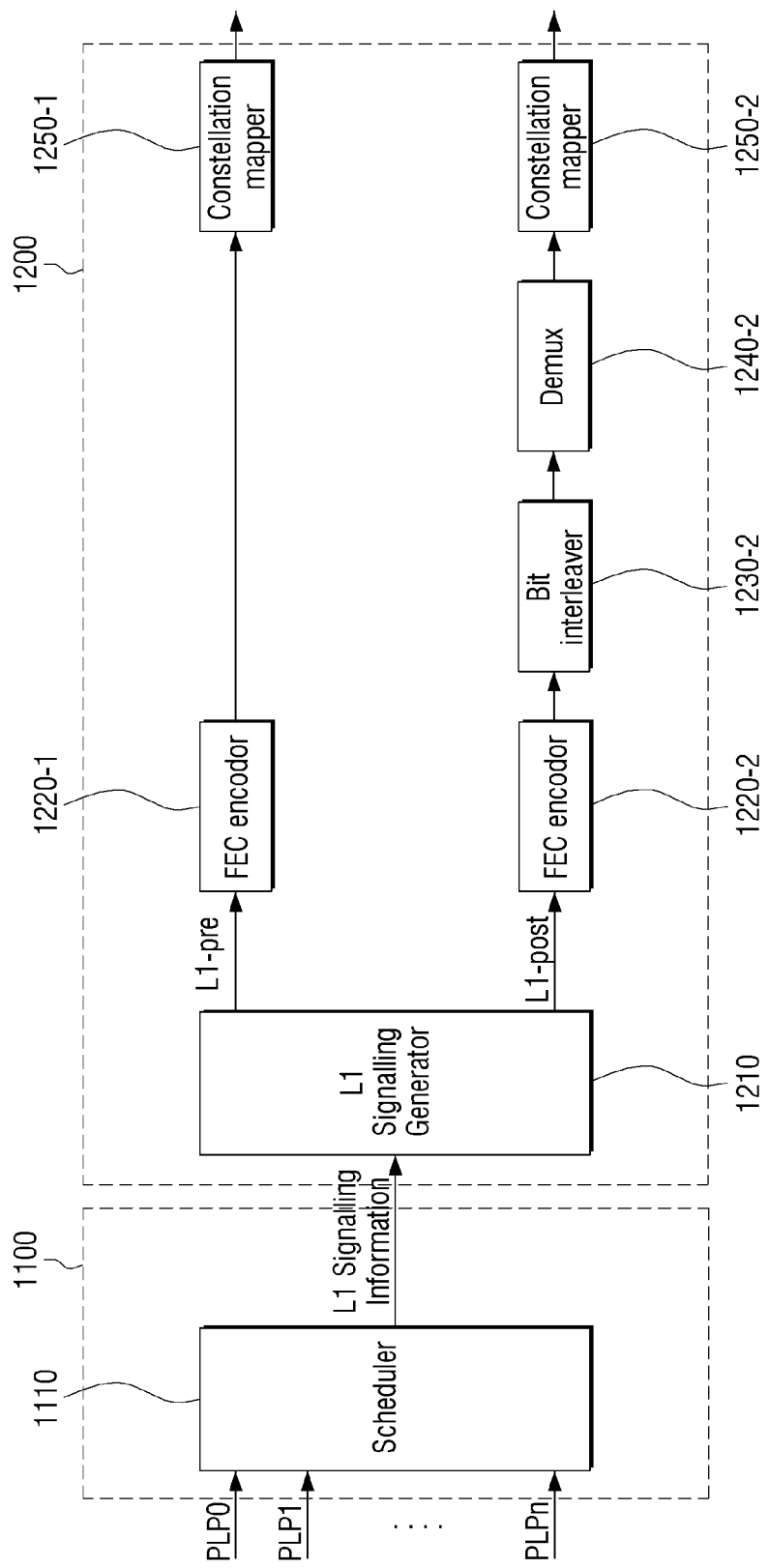
FIG. 5 is a block diagram to describe a configuration of generating signaling information, according to an exemplary embodiment.

FIG. 5 is a block diagram to describe a configuration of generating signaling information, according to an exemplary embodiment.

To be specific, FIG. 5 illustrates a configuration of generating L1 signaling information which is used by the DVB-T2 transmission system 1000 of FIG. 4, but the process of generating the L1 signaling information may be applied in the same manner as the process applied to the signaling generation apparatus 300 which is used for the ATSC 3.0 system 200 in FIG. 2, according to an exemplary embodiment.

In FIG. 5, the input processor 1110 and the BICM encoder 1200 included in the DVB-T2 transmission system 1000 of FIG. 4 are illustrated. The input processor 1100 may include a scheduler 1110. The BICM encoder 1200 may include an L1 signaling generator 1210, FEC encoders 1220-1 and 1220-2, a bit interleaver 1230-2, a demultiplexer 1240-2, and constellation mappers 1250-1 and 1250-2. The BICM encoder 1200 may further include a time interleaver (not illustrated). The L1 signaling generator 1210 may be included in the input processor 1100 instead of the BICM encoder 1200.

N pieces of service data are mapped with PLP0 to PLPn. The scheduler 1110 determines locations, modulations, and code rates of a plurality of PLPs to map the PLPs with physical layers of a T2 frame. That is, the scheduler 1110 generates an L1 signaling. In some cases, the scheduler 1110 may output dynamic information of an L1-post signaling of a current frame to the frame builder 1300. The scheduler 1110 may transmit the L1 signaling to the BICM encoder 1200. The L1 signaling includes an L1-pre signaling and an L1-post signaling.

The L1 signaling generator 1210 generates and outputs the L1-pre signaling and the L1-post signaling in a distinctive manner. The FEC encoders 1220-1 and 1220-2 perform FEC encoding including shortening and puncturing on the L1-pre signaling and the L1-post signaling, respectively. The bit interleaver 1230-2 performs interleaving on the encoded L1-post signaling in bit units. The demultiplexer 1240-2 controls orders of bits constituting a cell to control bit robustness, and outputs the cell including the bits. Two constellation mappers 1250-1 and 1250-2 map the L1-pre signaling and the L1-post signaling with a constellation, respectively. The L1-pre signaling and the L1-post signaling processed through the above-described process are output to the frame builder 1230. Thus, the L1-pre signaling and the L1-post signaling may be inserted into a frame.

The process of generating L1 signaling may be performed in the same manner by the signaling generation apparatus 300 of FIG. 3.

Figure 6:
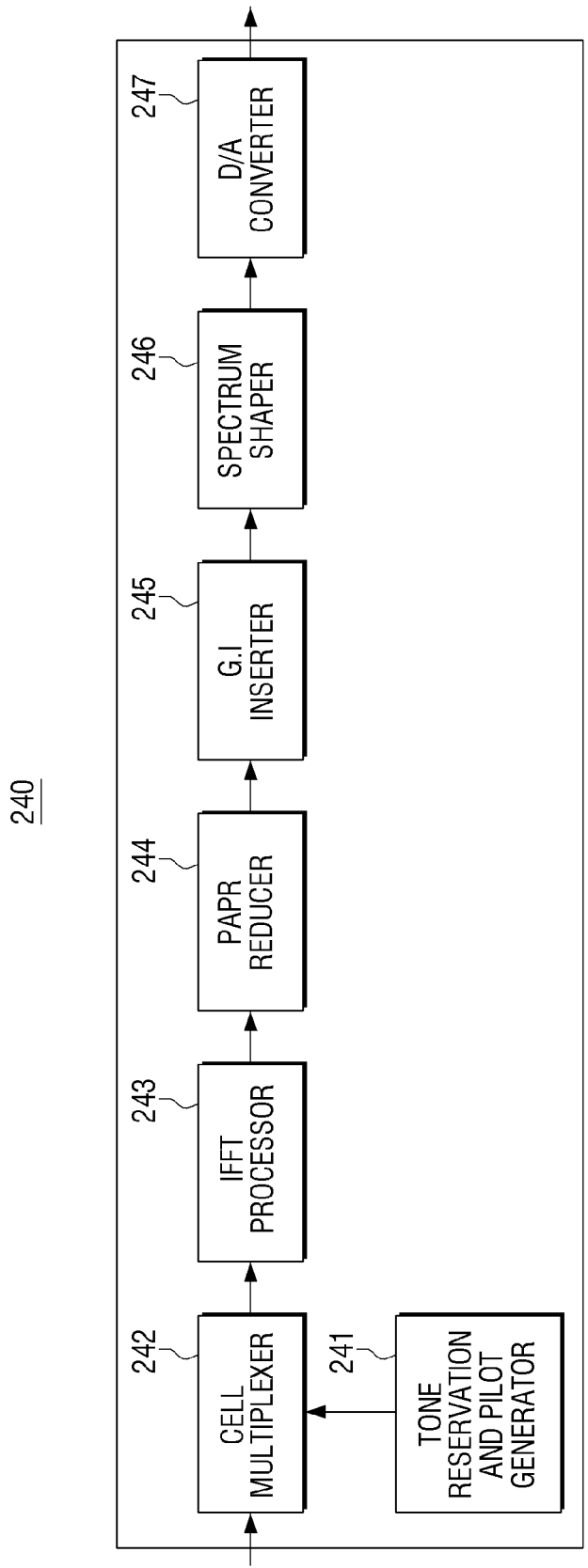
FIG. 6 is a block diagram illustrating a detailed configuration of an OFDM waveform generator, according to an exemplary embodiment.

FIG. 6 is a block diagram illustrating a detailed configuration of an OFDM waveform generator, according to an exemplary embodiment.

Referring to FIG. 6, an OFDM waveform generator 240 includes a tone reservation and pilot generator 241, a cell multiplexer 242, an IFFT processor 243, a PAPR reducer 244, a guard interval inserter 245, a spectrum shaper 246, and a digital to analog (D/A) converter 247.

The tone reservation and pilot generator 241 and the cell multiplexer 242 insert a continuous pilot and a scattered pilot together with a data cell into an ATSC 3.0 frame through multiplexing. Thus, a receiving apparatus (not illustrated) may perform channel estimation using the pilots, and correct a frequency offset. The tone reservation may be optionally used to reduce a PAPR.

The IFFT processor 243 converts the ATSC 3.0 frame, in which the pilots and a reserved tone are inserted, into a signal on a time domain.

The PAPR reducer 244 calculates a size of a PAPR pilot from the converted signal on the time domain to reduce a PAPR size. Specifically, the PAPR is a reference indicating an effect which a baseband transmission signal has on a transmitting apparatus 100, and means a ratio of peak power to average power. That is, the power of the transmitting apparatus 100 typically means the average power. However, the peak power exists in the actually transmitted power, and if the peak power is not designed properly, the peak power causes mutual modulation to degrade broadcasting quality. Thus, the transmitting apparatus 100 has to transmit a broadcast signal in such a manner that the PAPR is reduced.

Then, the guard interval inserter 245 inserts a guard interval to each symbol of a signal output from the PAPR reducer 244 to prevent interference between symbols.

The spectrum shaper 246 may perform filtering on a signal output from the guard interval inserter 245 to minimize interference between adjacent transmission channels. Specifically, the filtering is suggested to improve spectrum shaping and accurately distinguish between the adjacent transmission channels after the OFDM signal is generated. In general, an impulse response of the filtering for the spectrum shaping reduces a length of an effective signal, and thus a filter length is needed to be reduced. However, the flat filters having no ripple may be inevitably a high-order filter. Thus, to shorten the filter length and minimize loss of the effective guard interval, the filter length is needed to be shortened while the effective spectrum shaping is performed on the OFDM signal.

A D/A converter 247 may convert a signal in which spectrum is formed to an analog signal.

Out of the detailed configuration of the OFDM waveform generator 240 which is illustrated in FIG. 6, the guard interval inserter 245 and the D/A converter 247 correspond to the guard interval inserter 120 and the transmitter 130 illustrated in FIG. 1, according to an exemplary embodiment, and in order to avoid interference among symbols, an operation of inserting guard intervals to each symbol with reduced PAPR and an operation of converting and transferring a spectrum formed signal to an analog signal may be performed by the guard interval inserter 120 and the transmitter 130.

So far, an overall configuration of the ATSC 3.0 system 200 illustrated in FIG. 2, and, to which part of the ATSC 3.0 system, the preamble symbol inserter 110, the guard interval inserter 120, and the transmitter 130 of the transmitting apparatus 100 correspond, and overall operations performed by the preamble symbol inserter 110, the guard interval inserter 120, and the transmitter 130 have been described. In detail, a preamble symbol and guard intervals according to an exemplary embodiment will be described.

Figure 7:
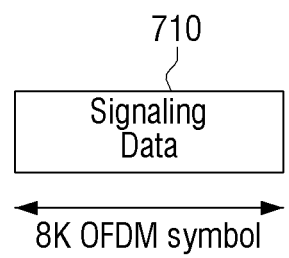
FIG. 7 illustrates a structure of a preamble symbol according to an exemplary embodiment.

FIG. 7 is a view illustrating a structure of a preamble symbol, according to an exemplary embodiment. Referring to FIG. 7, the preamble symbol 710 includes signaling information to decode data. When the signaling information is inserted in each symbol, an overhead occurs, and thus, in order to reduce such overhead, a preamble symbol which is inserted in a starting part of a frame includes the signaling information, and the preamble symbol 710 may be in a size of 8 K, FFT. In addition, signaling information which is inserted in the preamble symbol 710 may be modulated by methods such as BPSK, QPSK, 16QAM, 64QAM, and 256QAM.

Figure 8:
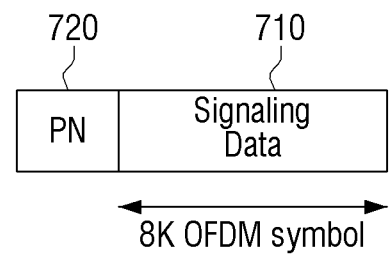
FIGS. 8-10 illustrate a preamble symbol and guard intervals according to an exemplary embodiment.
Figure 9:
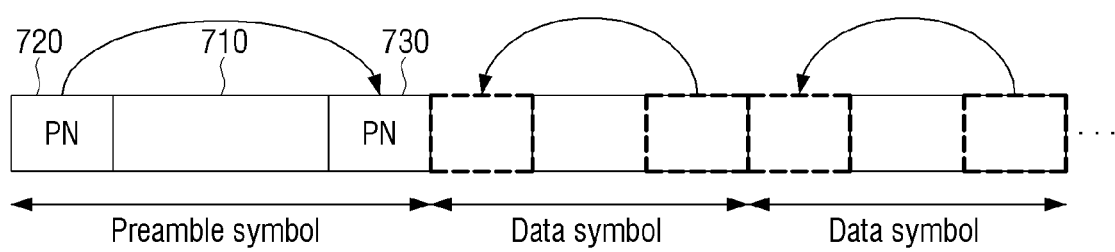
Figure 10:
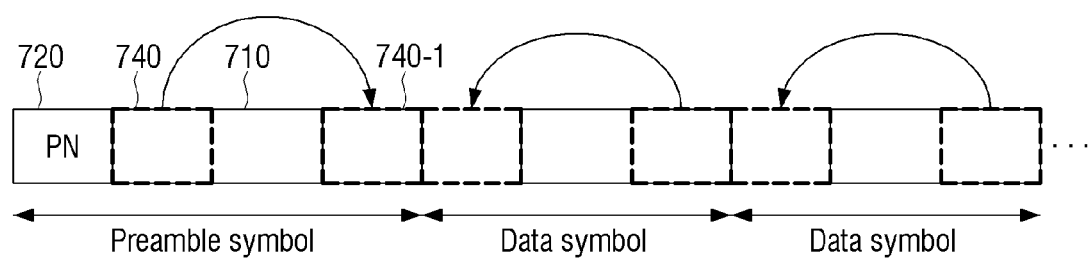

FIGS. 8-10 are views to describe a preamble symbol and guard intervals, according to an exemplary embodiment.

Referring to FIG. 8, one preamble symbol 710 includes entire signaling information to process data symbols included in one frame, and such signaling information includes a parameter which is required to decode a data symbol, and thus, robust decoding of a preamble symbol is essential.

Accordingly, the guard interval inserter 120 (FIG. 1), for robust signal detection and initial synchronization, may insert a guard interval 720 including a PN sequence at a front end of the preamble symbol 710.

The preamble symbol 710 in a front end of which the guard interval 720 including the PN sequence is inserted has a different structure with a data symbol with a cyclic-prefix (CP)-OFDM structure, and thus, performance degradation may occur under a multi-path channel environment due to interference by the inter carrier interference/inter symbol interference (ICI/ISI).

Accordingly, the guard interval inserter 120 may insert a postfix, that is, a guard interval to a back end of the preamble symbol 710.

Here, the guard interval 710 which is inserted in the front end of the preamble symbol 710, from among the guard intervals which are inserted in both ends of the preamble symbol 710, includes a PN sequence, and a guard interval which is inserted in the back end may include one of a PN sequence and a part of signaling information included in the preamble symbol.

To be specific, a method of inserting a guard interval by the guard interval inserter 120 in a back end of a preamble symbol is as shown below.

Referring to FIG. 9, the guard interval inserter 120 may insert a guard interval 720 including a PN sequence in a front end of the preamble symbol 710 including signaling information, and insert a guard interval 730 including a PN sequence in a back end of the preamble symbol 710. Here, PN sequences which are inserted in the front end and back end of the preamble symbol 710 may be the same or different from each other.

FIG. 9 indicates that the preamble symbol 710 and the guard intervals 720 and 730 which are inserted in both ends are indicated as a preamble symbol. To be more accurate, a section 710 which includes signaling information is a preamble symbol, but in the DVB-T2 system, a section which also includes a guard interval is seen as a P1 symbol, and thus a section which includes all the guard intervals 720 and 730 may be viewed as a preamble symbol.

The guard interval inserter 120 may copy a part of data which is included in each of a plurality of data symbols and insert the data in a guard interval which is inserted in a front end of each data symbol. This frame structure in which a part of data is inserted in a front end of each data symbol is indicated as cyclic-prefix (CP)-OFDM structure.

Referring to FIG. 10, the guard interval inserter 120 may insert the guard interval 720 including a PN sequence in a front end of the preamble symbol 710 which includes signaling information, copy a part 740 of the signaling information included in the preamble symbol 710, and insert the copied part 740 of the signaling information in a guard interval 740-1 which is inserted in a back end of the preamble symbol 710.

As described above, the part 740 of the signaling information which is inserted in a back end of the preamble symbol 710 is called cyclic-postfix.

In addition, the guard interval inserter 120 may copy a part of data which is inserted in each of a plurality of data symbols and insert the copied part of data in a guard interval which in inserted in a front end of each data symbol.

In case when a length of a frame is presumed to be 250 ms at the maximum, the PN sequence or cyclic-postfix which is inserted in the back end of the preamble symbol 710 corresponds to 0.532 ms, which is 0.2% of the frame, and therefore, an overhead by the PN sequence or cyclic-postfix inserted in the back end of the preamble symbol 710 is not a significant level, and thus, is ignorable.

The guard interval inserter 120 may insert a PN sequence with a preset size in the preamble symbol 710. To be specific, FIG. 11 is referred to as below.

Figure 11:
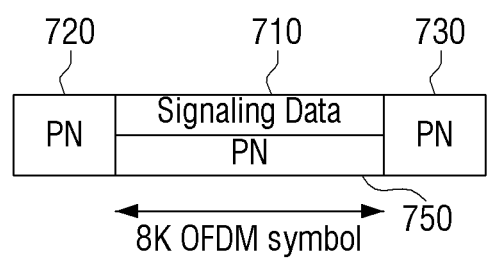
FIG. 11 is a view illustrating a structure of a preamble symbol according to another exemplary embodiment.

FIG. 11 is a view illustrating a structure of a preamble symbol, according to another exemplary embodiment.

Referring to FIG. 11, at both ends of the preamble symbol 710, guard intervals 720 and 730 which include a PN sequence are inserted, and within the preamble symbol 710, signaling information and a PN sequence 750 are inserted.

In other words, under a multipath channel environment, if a delay section of signals of each channel is longer than a guard interval, a receiving apparatus (not illustrated) may not sufficiently perform channel estimation with only a PN sequence at a front end of the preamble symbol 710, and therefore, the guard interval inserter 120 inserts a PN sequence with a preset size in the preamble symbol 710 as well.

The receiving apparatus (not illustrated) may perform channel estimation by using a PN sequence with a preset size which is inserted in the preamble symbol 710.

Accordingly, a preamble symbol according to an exemplary embodiment may have two structures. To be specific, there is provided a structure in which, in both ends of the preamble symbol 710, a guard interval which includes a PN sequence is inserted, and in the preamble symbol 710, a PN sequence with a preset size is inserted.

There is provided another structure in which, in a front end of the preamble symbol 710, a guard interval which includes a PN sequence is inserted, a guard interval which includes a part of signaling information included in the preamble symbol 710 is inserted in a back end, and a PN sequence with a preset size is inserted in the preamble symbol 710.

With respect to a structure in which, in both ends of the preamble symbol 710, a guard interval which includes a PN sequence is inserted, and in the preamble symbol 710, a PN sequence with a preset size is inserted, the guard interval inserter 120 may insert a PN sequence by two methods as described below.

Figure 12:
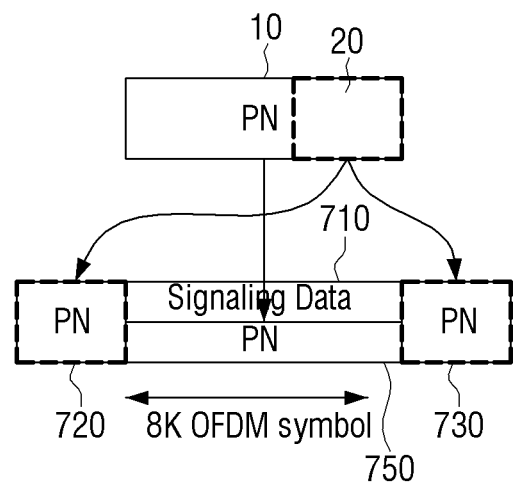
FIGS. 12 and 13 are views to describe a method for inserting a PN sequence, according to an exemplary embodiment.
Figure 13:
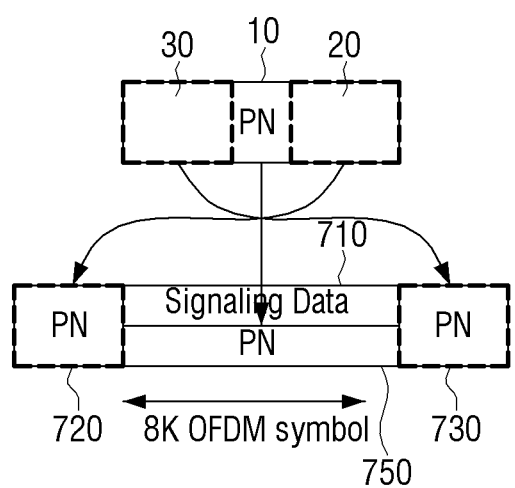

FIGS. 12 and 13 are views to describe a method for inserting a PN sequence, according to an exemplary embodiment.

The guard interval inserter 120 may generate a PN sequence with a size which is the same as a size of the preamble symbol 710, and insert a part of the generated PN sequence to each guard interval which is inserted in both ends of the preamble symbol 710, or insert different parts from among the generated PN sequence to the guard intervals which are inserted in both ends.

In addition, the guard interval inserter 120 may generate a PN sequence which is the same size as a size of the preamble symbol 710, scale down of a generated PN sequence to a predetermined size, and insert the scaled down PN sequence into the preamble symbol 710.

Referring to FIG. 12, the guard interval inserter 120 may generate a PN sequence 10 which is the same size as a size of the preamble symbol 710, copy a part 20 from among the generated PN sequence 10, and insert the copied part 20 in each of the guard intervals 720 and 730 which are inserted in both ends of the preamble symbol 710. That is, the PN sequence which is inserted in the guard intervals 720 and 730 which are inserted in both ends of the preamble symbol 710 are the same with each other.

The guard interval inserter 120 may scale down the PN sequence 10 which is the same size as the preamble symbol 710 to a predetermined size, and may insert the PN sequence 750 having the predetermined size in the preamble symbol 710.

To be specific, the guard interval inserter 120 multiplies a scale down factor Q with the PN sequence 10 which is the same size as the generated preamble symbol 710, and adds an output value from the multiplication with signaling information which is inserted in the preamble symbol 710.

Referring to FIG. 13, the guard interval inserter 120 may generate the PN sequence 10 which has the same size as the preamble symbol 710, copy the different parts 20 and 30 from among the generated PN sequence 10, and insert the copied parts 20 and 30 in the guard intervals 720 and 730, respectively, which are inserted in both ends of the preamble symbol 710. In other words, PN sequences which are inserted in the guard intervals 720 and 730 which are inserted in both ends of the preamble symbol 710 are different from each other.

In addition, the guard interval inserter 120 may scale down the PN sequence 10 which has the same size as the preamble symbol 710 to a predetermined, and may insert a PN sequence 750 having the predetermined size in the preamble symbol 710. In the same manner, after the guard interval inserter 120 multiplexes a scale down factor Q with the PN sequence 10 having the same size as the generated preamble symbol 710, add an output value from the multiplication with signaling information inserted in the preamble symbol 710.

Here, the size of the preamble symbol 710 may be 8 K, and the size of a PN sequence which is inserted in the guard intervals which are inserted in both ends of the preamble symbol 710 may be 3648 samples. As described above, when a size of a preamble symbol and a size of a guard interval have a fixed value, no additional algorithm to estimate the value is necessary, and thus, data transmission rate and efficiency will be improved.

The guard interval inserter 120 scales down the generated PN sequence to a predetermined size and inserts the PN sequence having the predetermined size in a preamble symbol. This operation is performed at a time domain, and is different from the DVB-T2 which inserts a pilot in a preamble symbol in a frequency domain.

Figure 14:
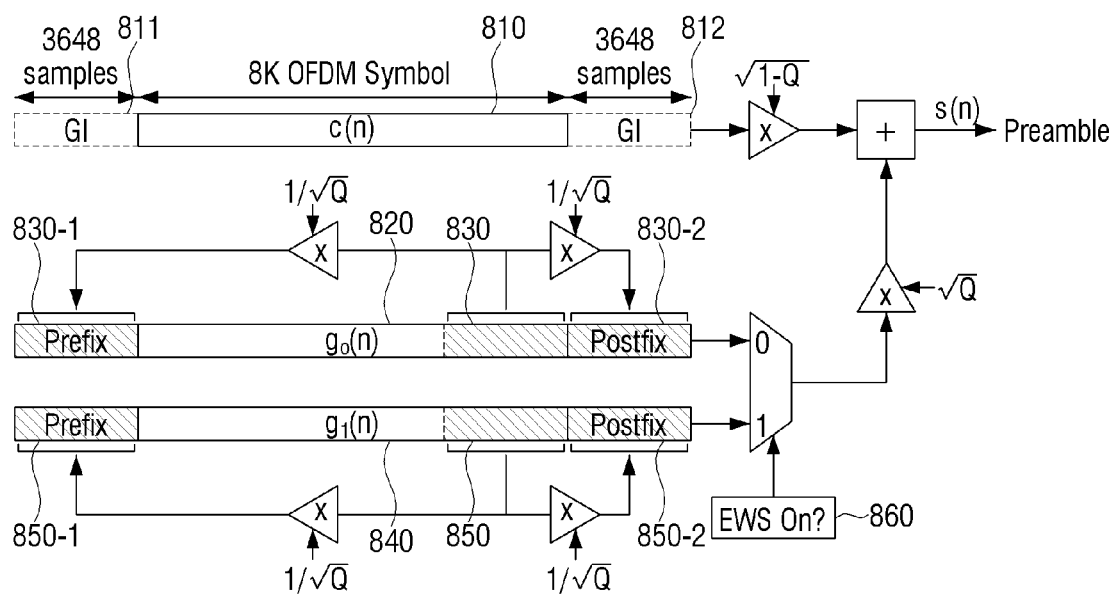
FIGS. 14 and 15 are views to describe a process of generating a preamble symbol in a greater detail according to an exemplary embodiment.
Figure 15:
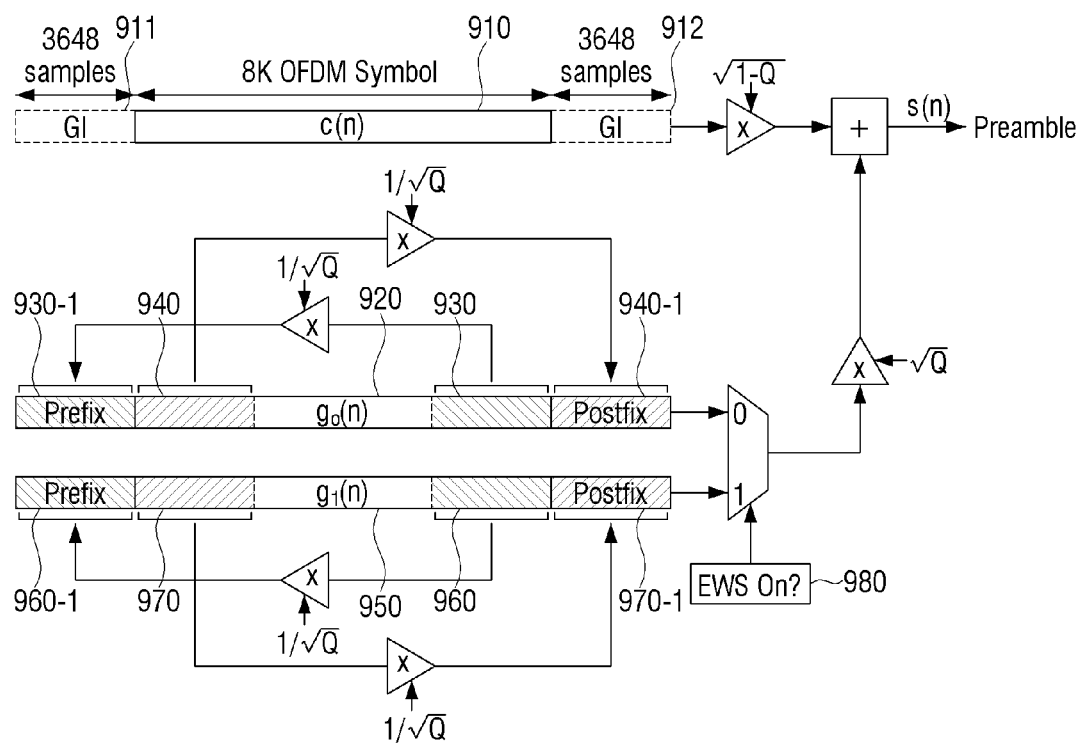

FIGS. 14-15 are illustrates a process of generating a preamble symbol in a greater detail, according to an exemplary embodiment.

FIG. 14 illustrates a preamble symbol 810 in a size of 8 K, which is generated from the preamble symbol generator 110, and a section in which a guard interval of 3648 sample size is to be inserted is indicated at both ends of the preamble symbol 810 in dotted lines.

The guard interval inserter 120 generates two PN sequences 820 and 840 having the same size as the preamble symbol 810, which is 8 K, and generates prefixes 830-1 and 850-1, and postfixes 830-2, 850-2 using a scale down factor Q from parts 830 and 850 of each of the generated PN sequences 820 and 840.

In addition, the guard interval inserter 120, depending on whether data is inserted regarding emergency warning system (EWS) (860), selects one of the generated PN sequences 820 and 840, and incorporates the selected PN sequence into the preamble symbol 810. Accordingly, a guard interval which includes the same PN sequence is inserted in both ends of a preamble symbol, and a part of a PN sequence having a predetermined size which has the same size as the preamble symbol is inserted in the preamble symbol.

FIG. 15 illustrates a preamble symbol 901 in a size of 8 K, which is generated from the preamble symbol generator 110, and at the both ends of the generated preamble symbol 910, a section in which a guard interval of 3648 sample size is to be inserted is indicated in dotted lines.

In addition, the guard interval inserter 120 generates two PN sequences 920 and 950 which have the same size as the preamble symbol 910. In addition, the guard interval inserter 120 generates prefix 930-1 and postfix 940-1 by using a scale down factor Q from different sections 930 and 940 of one PN sequence 920.

In addition, the guard interval inserter 120 generates prefix 960-1 and postfix 970-1 using the scale down factor Q from different sections 960 and 970 of another PN sequence 950.

In addition, the guard interval inserter 120, depending on whether data related to emergency warning system (EWS) is inserted or not (980), selects one of the generated PN sequences 920 and 950 and incorporates the selected PN sequence in the preamble symbol 910. Accordingly, the guard intervals which include different sections of a PN sequence are inserted in both ends of the preamble symbol, respectively, and a part of the PN sequence having the same size as the preamble symbol is inserted into the preamble symbol.

Figure 16:
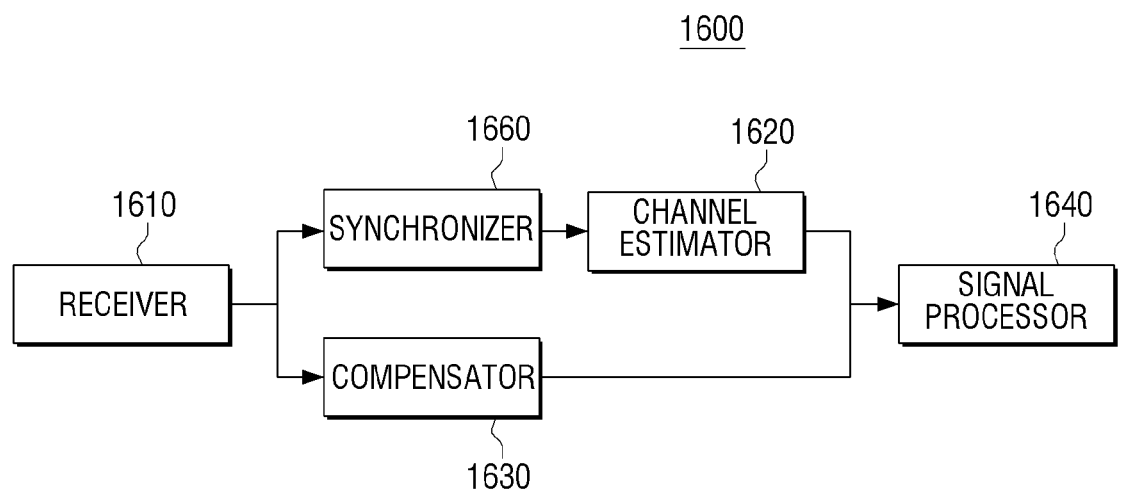
FIG. 16 is a block diagram illustrating a configuration of a receiving apparatus according to an exemplary embodiment.

FIG. 16 is a block diagram illustrating a configuration of a receiving apparatus according to an exemplary embodiment.

According to FIG. 16, a receiving apparatus 1600 includes a receiver 1610, a synchronizer 1660, a channel estimator 1620, a compensator 1630, and a signal processor 1640.

The receiver 1610 receives a frame which includes at least one data symbols and a preamble symbol. The preamble symbol includes signaling information and guard intervals which are inserted in both ends of the preamble symbol. Here, one of the guard intervals which are included in both ends of the preamble symbol includes a PN sequence and the other guard interval receives includes one of a PN sequence and a part of the signaling information.

Here, the guard interval which is inserted in a front end of the preamble symbol includes the PN sequence, and the guard interval which is inserted in the back end of the preamble symbol includes the PN sequence and a part of the signaling information.

The synchronizer 1660 may compensate the preamble symbol and perform synchronization based on at least one PN sequence included in the guard intervals. To be specific, the synchronizer 1660 may estimate a frequency offset and a sampling offset based on at least one PN sequence, compensate the preamble symbol based on the estimated frequency offset and sampling offset and perform synchronization.

The channel estimator 1620 performs channel estimation based on the compensated preamble symbol.

The compensator 1630, based on at least one of a part of the signaling information and PN sequence included in the guard intervals, may compensate inter carrier interference/inter symbol interference (ICI/ISI).

The signal processor 1640 may detect the signaling information from an output of the channel estimator 1620 and the compensator 1630, and process the data symbol based on the detected signaling information.

Figure 17:
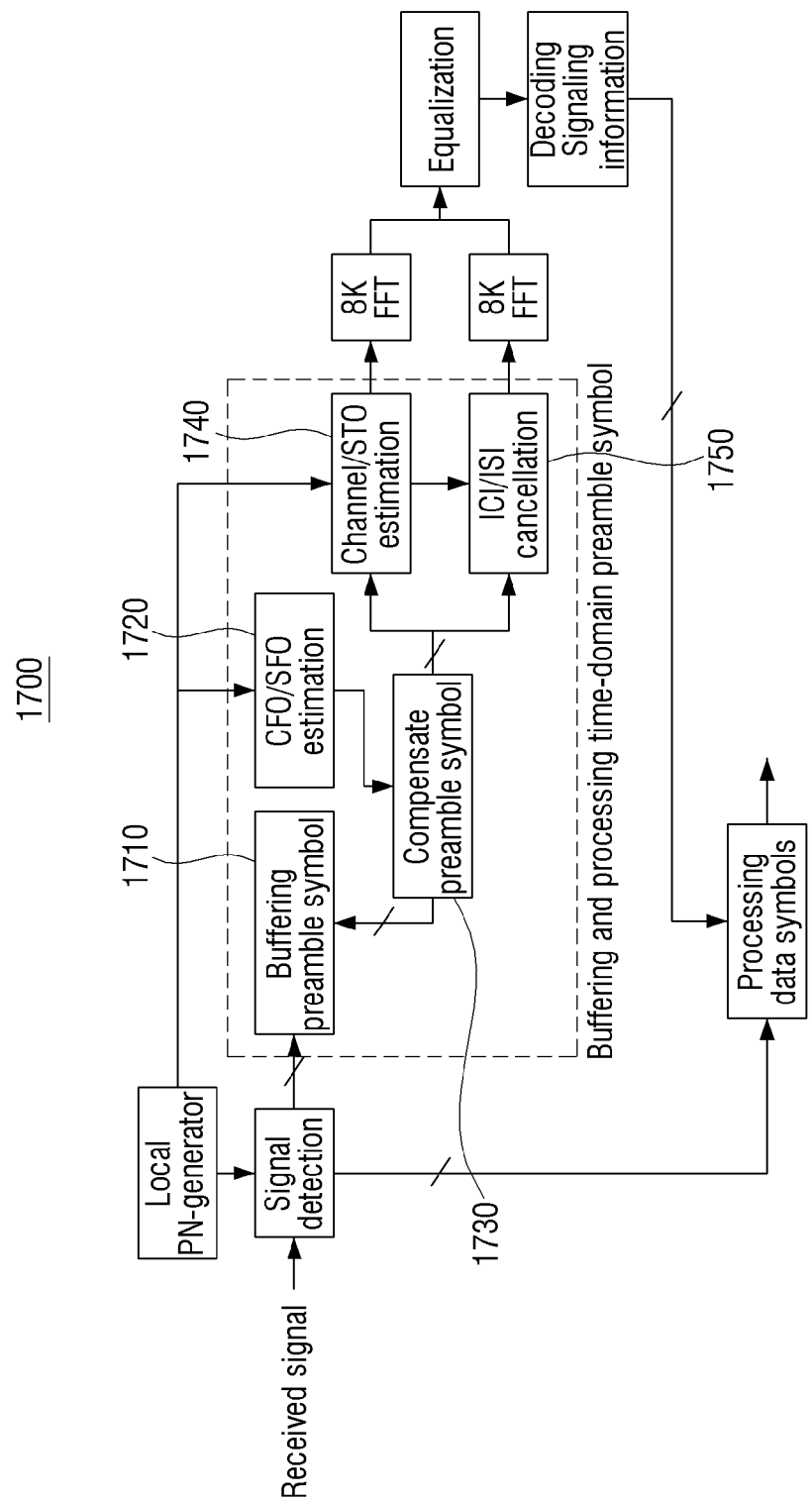
FIG. 17 is a block diagram illustrating a detailed configuration of a receiving apparatus according to an exemplary embodiment.

FIG. 17 is a block diagram illustrating a detailed configuration of a receiving apparatus according to an exemplary embodiment.

Referring to FIG. 17, a receiving apparatus 1700 according to an exemplary embodiment may include a buffer 1710 for synchronization operation, a carrier frequency offset/sampling frequency offset (CFO/SFO) estimator 1720, and a preamble symbol compensator 1730.

The receiving apparatus 1700 performs signal detection based on a PN sequence which is located at a front end of a preamble symbol included in a frame. Here, the receiving apparatus 1700 may correlate the PN sequence with a pre-stored PN sequence to detect the largest correlation value, and accordingly, perform signal detection, that is, detection of the preamble symbol and symbol timing offset (STO) estimation.

Here, if guard intervals which include PN sequences are inserted in both ends of the preamble symbol, the receiving apparatus 1700, based on these PN sequences inserted in the both ends, may perform detection of the preamble symbol and estimation of a symbol timing offset (STO) more accurately.

When the preamble symbol is detected, the buffer 1710 may buffer the preamble symbol in order to perform a robust synchronization operation at an initial stage.

In addition, the carrier frequency offset/sampling frequency offset (CFO/SFO) estimator 1720 may estimate the CFO/SFO based on the PN sequence included in the guard interval which is inserted in a front end of the preamble symbol. Likewise, if the guard intervals which include PN sequences are included in both ends of the received preamble symbol, the CFO/SFO estimator 1720 may estimate CFO/SFO more accurately based on these PN sequences.

In addition, the preamble symbol compensator 1730 may compensate the preamble symbol which is buffered in the buffer 1710 based on the CFO/SFO value estimated by the CFO/SFO estimator 1720.

Then, a channel/STO estimator 1740 may perform channel estimation based on the compensated preamble symbol.

In addition, the ICI/ISI cancellation unit 1750 may remove ICI/ISI based on the compensated preamble symbol.

To be specific, the compensator 1630 which corresponds to the ICI/ISI cancellation unit 1750 may compensate ICI/ISI based on at least one of signaling information included in the guard interval and PN sequence, and more particularly, if the guard intervals which are inserted in both ends of the preamble symbol include PN sequences, a PN sequence which acts as an interference signal may be removed, and ICI/ISI may be compensated using a part of signaling information constituting the preamble symbol. This will be further detailed with reference to FIGS. 18 and 19.

Figure 18:
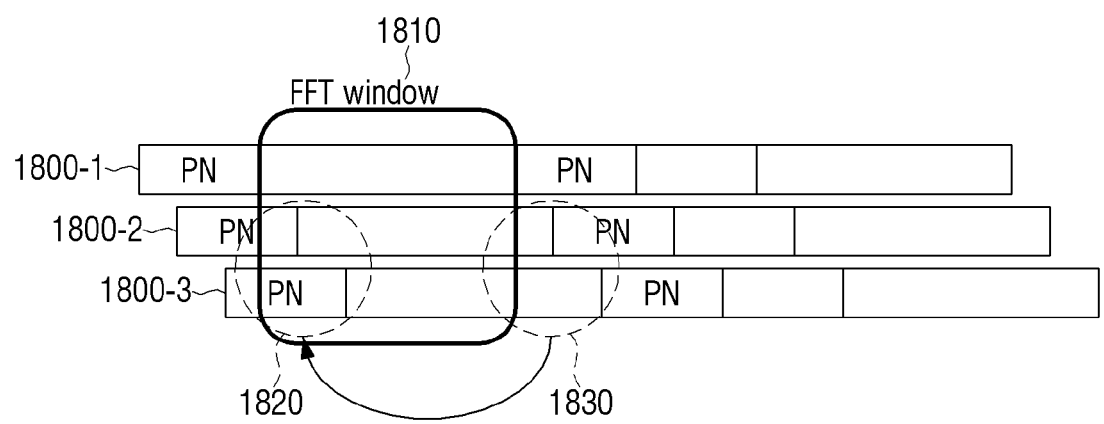
FIGS. 18 and 19 are views relating to a method for compensating ICI/ISI, according to an exemplary embodiment.
Figure 19:
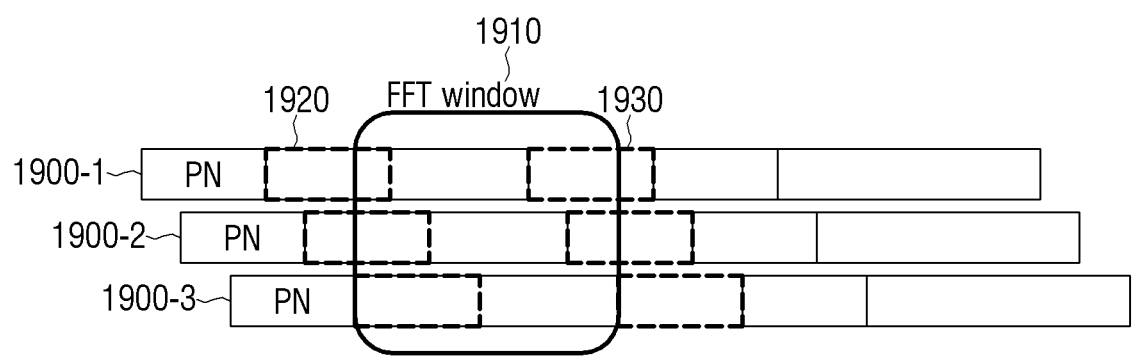

FIGS. 18 and 19 illustrate a method for compensating ICI/ISI, according to an exemplary embodiment.

Referring to FIG. 18, three frames 1800-1, 1800-2, 1800-3 which are received under a multipath channel environment are illustrated. In both ends of each preamble symbol which is located at a front of each of the three frames 1800-1, 1800-2, 1800-3, guard intervals which include PN sequences are inserted in both ends of the preamble symbol. In this case, the compensator 1630 locates an FFT window 1810 based on a preamble symbol of the first frame 1800-1 which is received first.

The compensator 1630 may remove PN sequences 1820 which act as interference at the second and third frame 1800-2 and 1800-3 based on the channel estimated at the channel estimator 1620. The compensator 1630 already knows information on the PN sequence, and thus, may delete only the PN sequences 1820 which act as interference signals from among the PN sequences.

In addition, the compensator 1630, by using postfix, that is, a part signaling information 1830 which is inserted in the preamble symbol 1820 which are removed. Accordingly, the compensator 1630 may remove the entire ISI/ICI.

In FIG. 19, three frames 1900-1, 1900-2, and 1900-3 which are received under a multipath channel environment are illustrated. Further, when a guard interval including a PN sequence is inserted in a front end of each preamble symbol of the three frames, and a guard interval 1930 in which a part 1920 of signaling information which constitutes the preamble symbol is copied and inserted is inserted in a back end of the each preamble symbol, the compensator 1630 locates an FFT window 1910 based on a preamble symbol of the third frame 1900-3 which is received last.

In this case, in the FFT window 1910, only signaling information which constitutes the preamble symbol is detected, but PN sequences which act as an interference signal are not detected, and therefore, ISI/ICI may be removed simply.

Thus, the compensator 1630 may remove ISI/ICI using different methods depending on whether the guard intervals which are inserted in both ends of the preamble symbol include PN sequences, or one of the guard intervals includes a PN sequence while another guard interval includes a part of signaling information.

A size of the preamble symbol which is processed by the receiving apparatus 1600 is 8 K, and a size of the PN sequence which is included in the guard intervals which are inserted in both ends of the preamble symbol is 3648 sample.

Figure 20:
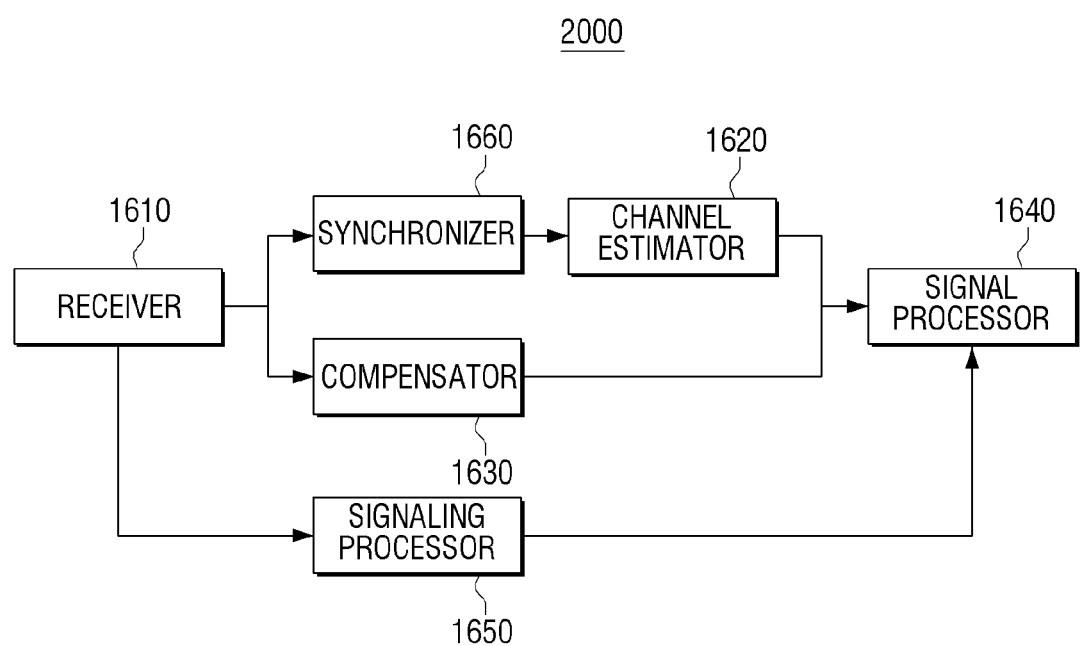
FIG. 20 is a block diagram illustrating a configuration of a receiving apparatus according to another exemplary embodiment.

FIG. 20 is a block diagram illustrating a configuration of a receiving apparatus according to another exemplary embodiment.

Referring to FIG. 20, a receiving apparatus 2000 includes the receiver 1610, the synchronizer 1660, the channel estimator 1620, the compensator 1630, the signal processor 1640, and a signaling processor 1650. Here, the receiver 1610, the channel estimator 1620, the compensator 1630, and the signal processor 1640 have been already described, and will not be further described.

The signaling processor 1650 may extract signaling information from a received preamble symbol. In particular, the signaling processor 1650 may extract and decode L1 signaling, and obtain values related to information on a protocol version of a frame, information on a frame type, and information on a method of inserting data in the frame.

Figure 21:
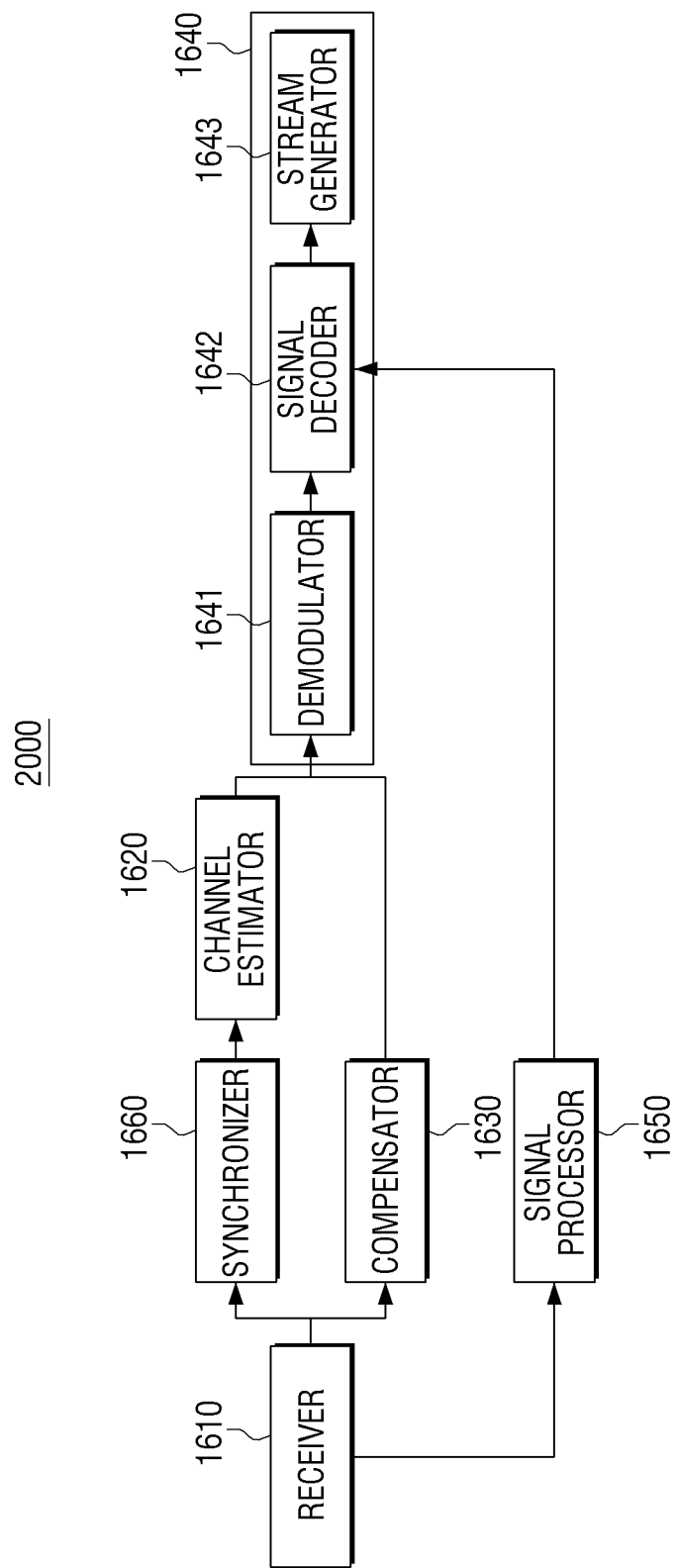
FIG. 21 is a block diagram to describe a signal processor in detail, according to an exemplary embodiment.

FIG. 21 is a block diagram to describe a signal processor in detail according to an exemplary embodiment.

Referring to FIG. 21, the signal processor 1640 of FIG. 16 or 20 includes a demodulator 1641, a signal decoder 1642, and a stream generator 1643.

The demodulator 1641 performs demodulation on a received RF signal according to at least one OFDM parameter and sync detection, and when the sync is detected, recognizes whether a mobile frame or a fixed frame is received from the information stored in a sync area.

In this case, when the OFDM parameter on a signaling area and a data area is not predetermined, demodulation may be performed by obtaining information regarding the OFDM parameter on the signaling area and the data area which are subsequent to the sync area.

The signal decoder 1642 performs decoding on the received data. In this case, the signal decoder 1642 may obtain a parameter such as an FEC method or a modulation method on the data stored in each data area using the signaling information detected from the signaling processor 1650, and perform decoding. In addition, the signal decoder 1642, based on data information included in a configurable post signaling and a dynamic post signaling, a location where data starts may be calculated. In other words, the signal decoder 1642 may calculate a location of a frame from which a PLP is transmitted.

The stream generator 1643 may process a baseband frame received from the signal decoder 1642 and generate data to be serviced.

The stream generator 1643, based on information on a protocol version of a frame which is provided by the signaling processor 1650, information on a frame type, and information on a method of inserting data, may generate an L2 packet from an L1 packet from which an error is corrected.

To be specific, the stream generator 1643 may include De-Jitter buffers, and the De-Jitter buffers, based on values related to information on a protocol version of a frame provided by the signaling processor 1650, information on a frame type, and information on a data inserting method, may regenerate accurate timing to restore ab output stream. Accordingly, a delay for sync among a plurality of PLPs may be compensated.

Figure 22:
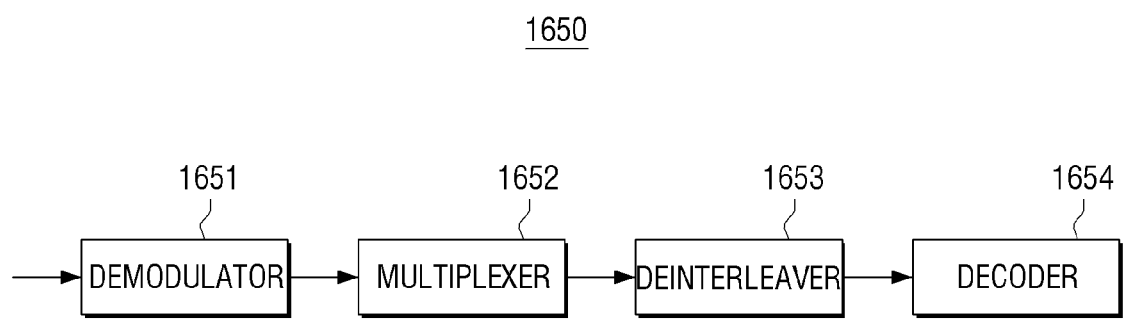
FIG. 22 is a block diagram illustrating a detailed configuration of a signal processor, according to an exemplary embodiment.

FIG. 22 is a block diagram illustrating a detailed configuration of a signal processor, according to an exemplary embodiment.

According to FIG. 22, a signaling processor 1650 includes a demodulator 1651, a multiplexer 1652, a deinterleaver 1653, and a decoder 1654.

The demodulator 1651 receives and demodulates a signal transmitted from the transmitting apparatus 100. To be specific, the demodulator 1651 demodulates a received signal, generates a value corresponding to an LDPC codeword, and outputs the value to the multiplexer 1652.

In this case, the value corresponding to an LDPC codeword may be indicated as a channel value regarding a received signal. Here, there are diverse methods to determine a channel value, e.g., a method for determining a log likelihood ratio (LLR) value.

Here, the LLR value may be indicated as a value which applies log to a ratio where a bit transmitted from the transmitting apparatus 100 may be 0 or 1. Or, the LLR value may be a bit value itself which is determined based on a hard decision, and the LLR value may be a representative value which is determined according to a section where the bit transmitted from the transmitting apparatus 100 may be 0 or 1.

The multiplexer 1652 multiplexes an output value of the demodulator 1651, and outputs this value to the deinterleaver 1653. Here, the output value of the demodulator 1651 corresponds to an LDPC codeword, for example, an LLR value.

To be specific, the multiplexer 1652 is an element which corresponds to the demultiplexer (FIG. 5, 1240-2) provided on the transmitting apparatus 100, and may inversely perform a demultiplexing operation which is performed by the demultiplexer 1240-2. That is, the multiplexer 1652 may convert the value which corresponds to an LDPC codeword which is output from the demodulator 1651 using parallel-to-serial conversion and multiplexes a value corresponding to the LDPC codeword.

The deinterleaver 1653 deinterleaves the output value of the multiplexer 1652 and outputs to the decoder 1654.

To be specific, the deinterleaver 1653 is an element which corresponds to the interleaver (FIG. 5, 1230-2) which is provided on the transmitting apparatus 100, which may inversely perform operations performed by the interleaver (FIG. 5, 1230-2). In other word, the deinterleaver 1653 may perform deinterleaving of a value corresponding to the LDPC codeword so as to correspond to interleaving operations performed by the interleaver (FIG. 5, 1230-2). Here, the value corresponding to the LDPC codeword may be an LLR value.

The decoder 1654 is an element which corresponds to the FEC encoder 1220-2 provided on the transmitting apparatus 100, and may inversely perform operations performed by the FEC encoder 1220-2. To be specific, the decoder 1654 may perform decoding based on the deinterleaved LLR value and output an L1 signaling.

Figure 23:
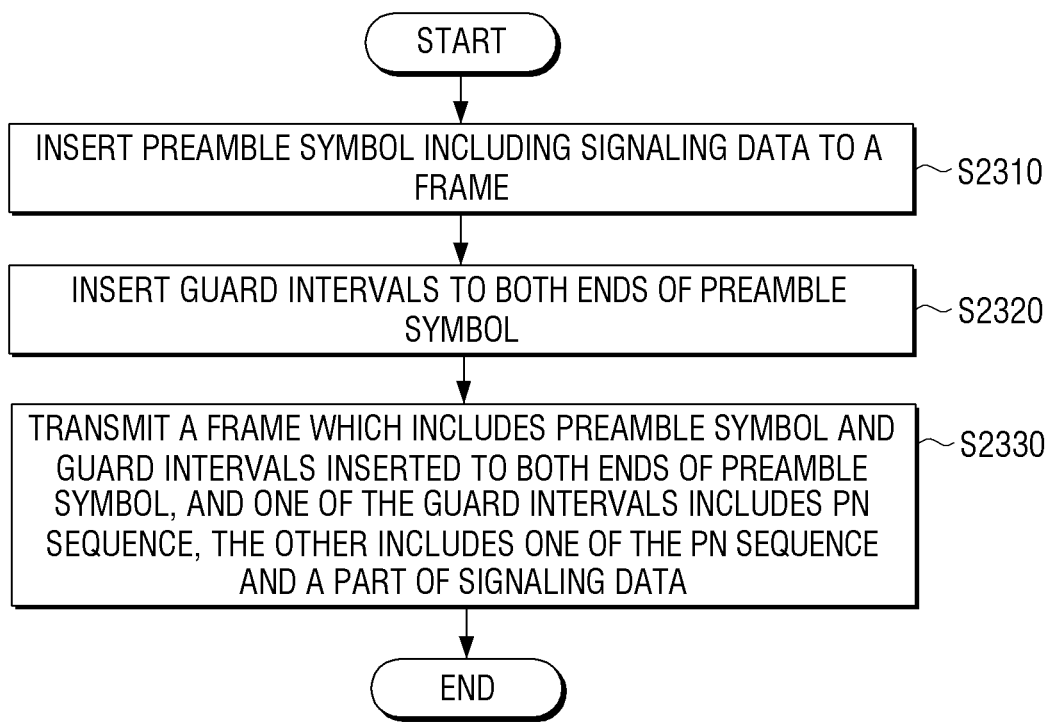
FIG. 23 is a flowchart to describe a method of controlling of a transmitting apparatus, according to an exemplary embodiment.

FIG. 23 is a flowchart to describe a method of controlling of a transmitting apparatus, according to an exemplary embodiment.

According to a method illustrated in FIG. 23, a preamble symbol including signaling information is inserted into a frame (S2310).

In addition, in both ends of the preamble symbol, guard intervals are inserted (S2320).

Then, a frame including the preamble symbol and the guard intervals is transmitted (S2330).

Here, one of the guard intervals inserted in both ends of the preamble symbol includes a PN sequence, and the other includes one of a PN sequence and a part of the signaling information.

Specifically, from among the guard intervals inserted in both ends of the preamble symbol, a guard interval which is inserted in a front end includes a PN sequence, and a guard interval which is inserted in a back end includes one of the PN sequence and a part of the signaling information.

In addition, the inserting a guard interval may include generating a PN sequence with a size which is the same as the size of the preamble symbol, inserting a part of the PN sequence to each of the guard intervals which are inserted in both ends of the preamble symbol, or inserting different parts of the generated PN sequence to the guard intervals which are inserted in both ends, respectively.

Meanwhile, a method illustrated in FIG. 23 may further include inserting a PN sequence with a predetermined size in the preamble symbol.

Here, the inserting a PN sequence with a preset size may include generating a PN sequence having the same size as the preamble symbol, and inserting the generated PN sequence in the preamble symbol by scaling down the generated PN sequence to a preset size.

In addition, a size of the preamble symbol is 8 K, and a size of the PN sequence which is included in the guard intervals that are inserted in both ends of the preamble symbol is 3648 sample.

Figure 24:
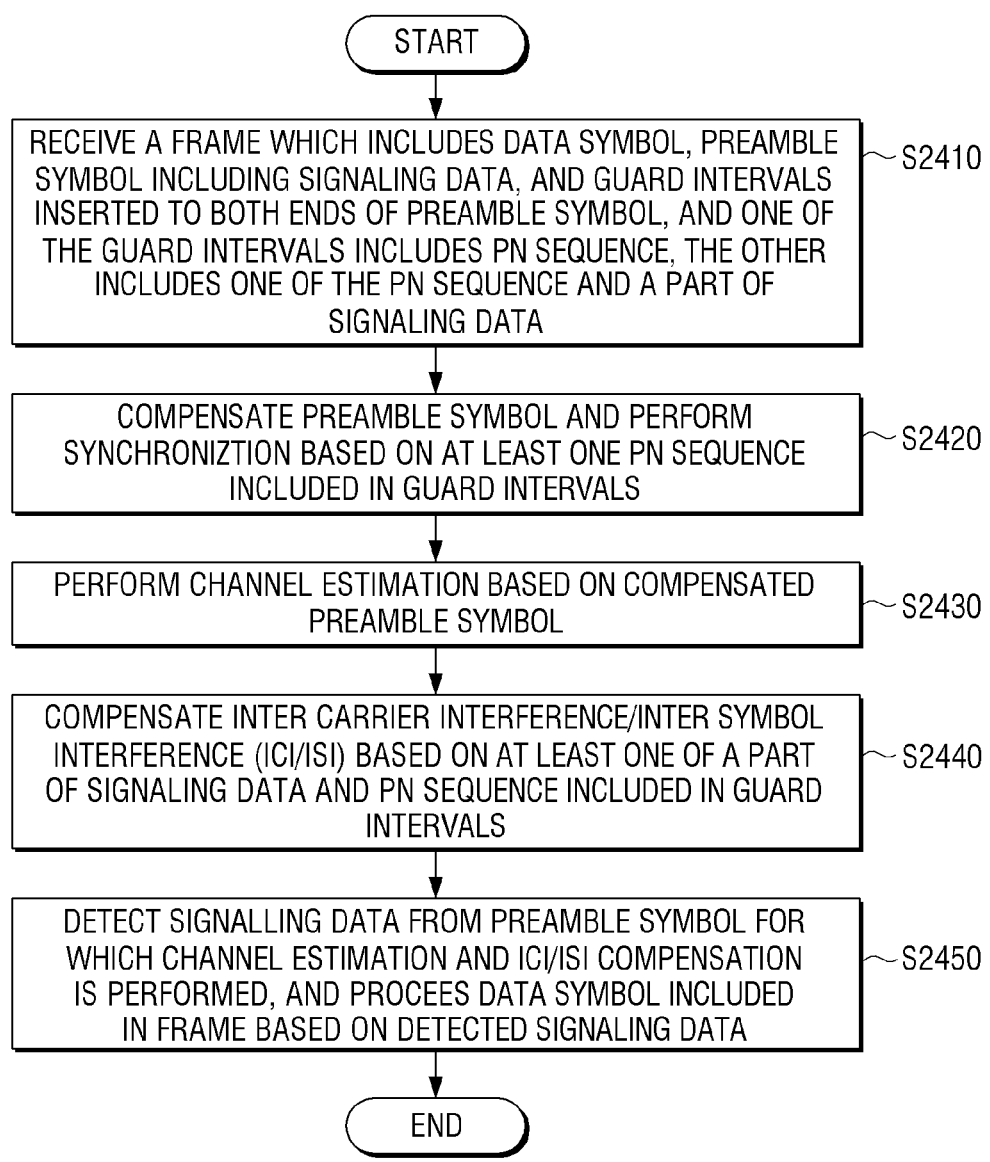
FIG. 24 is a flowchart to describe a method of controlling of a receiving apparatus, according to an exemplary embodiment.

FIG. 24 is a flowchart to describe a method of controlling of a receiving apparatus according to an exemplary embodiment.

According to a method illustrated in FIG. 24, a frame which includes at least one data symbol and a preamble symbol including signaling information is received. Here, guard intervals are inserted in both ends of the preamble symbol. One of the guard intervals includes a PN sequence, and the other includes one of a PN sequence and a part of signaling information (S2410).

In addition, based on at least one PN sequence which is included in the guard intervals, the preamble symbol is compensated and synchronization is performed (S2420).

Here, performing synchronization includes estimating a frequency offset and a sampling offset based on at least one PN sequence, compensating the preamble symbol based on the estimated frequency offset and sampling offset, and performing synchronization.

In addition, based on the compensated preamble symbol, channel estimation is performed (S2430).

Then, based on at least one of a part of signaling information included in the guard intervals and the PN sequence, ICI/ISI is compensated (S2440).

Further, the signaling information may be extracted from the preamble symbol for which channel estimation and ICI/ISI compensation are performed, and the data symbol included in the frame based on the extracted signaling information may be processed (S2450).

In addition, the guard interval which is inserted in the front end of the preamble symbol includes a PN sequence, and the guard interval inserted in the back end of the preamble symbol includes one of the PN sequence and a part of the signaling information.

A non-transitory computer readable medium in which a program which sequentially performs the above method of controlling a transmitting apparatus or a receiving apparatus is stored therein may be provided.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided.

At least one of the components, elements or units represented by a block as illustrated in FIGS. 1-6, 16, 17 and 20-22 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. A transmitting apparatus comprising:
    a preamble symbol inserter configured to insert in a frame a preamble symbol comprising signaling information;
    a guard interval inserter configured to insert a plurality of guard intervals in both ends of the preamble symbol, respectively; and
    a transmitter configured to transmit a frame comprising the preamble symbol and the guard intervals,
    wherein one of the guard intervals comprises a pseudo random noise (PN) sequence and another guard interval comprises one of the PN sequence and a part of the signaling information,
    wherein the guard interval inserter is further configured to generate the PN sequence which is a same size as a size of the preamble symbol, and insert a part of the generated PN sequence to each of the guard intervals or insert different parts of the generated PN sequence to the guard intervals, respectively.

2. The apparatus of claim 1, wherein a guard interval which is inserted in a front end of the preamble symbol comprises the PN sequence, and a guard interval which is inserted in a back end of the preamble symbol comprises one of the PN sequence and the part of the signaling information.

3. The apparatus of claim 1, wherein the guard interval inserter is further configured to generate a PN sequence having a predetermined size, and insert the generated PN sequence in the preamble symbol.

4. The apparatus of claim 3, wherein the generated PN sequence has a same size as the preamble symbol, and
    wherein the guard interval is further configured to scale down the generated PN sequence to the predetermined size, and insert the scaled down PN sequence in the preamble symbol.

5. The apparatus of claim 1, wherein a size of the preamble symbol is 8 K, and a size of the PN sequence included in each of the guard intervals is 3648 samples.

6. A receiving apparatus comprising:
    a receiver configured to receive a data symbol, a preamble symbol comprising signaling information and a plurality of guard intervals inserted in both ends of the preamble symbol, wherein one of the guard intervals comprises a pseudo random noise (PN) sequence and another guard interval comprises one of the PN sequence and a part of the signaling information;
    a synchronizer configured to compensate the preamble symbol and perform synchronization based on the PN sequence included in the guard intervals;
    a channel estimator configured to perform channel estimation based on the compensated preamble symbol;
    a compensator configured to compensate inter carrier interference/inter symbol interference (ICI/ISI) based on at least one of the part of the signaling information and the PN sequence included in the guard intervals; and
    a signal processor configured to detect the signaling information from an output of the channel estimator and the compensator, and process the data symbol included in the frame based on the detected signaling information.

7. The apparatus of claim 6, wherein the synchronizer, based on the PN sequence, is configured to estimate a frequency offset and a sampling offset, compensate the preamble symbol and perform synchronization based on the estimated frequency offset and sampling offset.

8. The apparatus of claim 6, wherein a guard interval which is inserted in a front end of the preamble symbol comprises the PN sequence and a guard interval which is inserted in a back end of the preamble symbol comprises one of the PN sequence and a part of the signaling information.

9. The apparatus of claim 6, wherein the compensator, if each of the guard intervals comprises the PN sequence, is configured to remove the PN sequence which acts as an interference signal, and compensate the ICI/ISI using a part of the signaling information which constitutes the preamble symbol.

10. The apparatus of claim 6, wherein a size of the preamble symbol is 8 K, and a size of the PN sequence is 3648 samples.

11. A method of controlling a transmitting apparatus, the method comprising:
inserting in a frame a preamble symbol comprising signaling information;
inserting a plurality of guard intervals in both ends of the preamble symbol; and
transmitting a frame comprising the preamble symbol and the guard intervals,
wherein one of the guard intervals comprises a pseudo random noise (PN) sequence and another guard interval comprises one of the PN sequence and a part of the signaling information,
wherein the inserting the guard interval comprises:
generating a PN sequence which is a same size as a size of the preamble symbol; and
inserting a part of the generated PN sequence to each of the guard intervals, or inserting different parts of the generated PN sequence to the guard intervals, respectively.

12. The method of claim 11, wherein a guard interval which is inserted in a front end of the preamble symbol comprises a PN sequence and a guard interval which is inserted in a back end of the preamble symbol comprises one of the PN sequence and a part of the signaling information.

13. The method of claim 11, further comprising:
generating a PN sequence having a predetermined size; and
inserting the generated PN sequence in the preamble symbol.

14. The method of claim 13, wherein the generated PN sequence has a same size as the preamble symbol, and
wherein the method further comprises:
scaling down the generated PN sequence to the predetermined size; and
inserting the scaled down PN sequence in the preamble symbol.

15. The method of claim 11, wherein a size of the preamble symbol is 8 K, and a size of the PN sequence included in each of the guard intervals is 3648 samples.

16. A controlling method of a receiving apparatus, the method comprising:
receiving a frame which comprises a data symbol, a preamble symbol comprising signaling information and a plurality of guard intervals inserted in both ends of the preamble symbol, wherein one of the guard intervals comprises a pseudo random noise (PN) sequence and another guard interval comprises one of the PN sequence and a part of the signaling information;
compensating the preamble symbol and performing synchronization based on the PN sequence included in the guard intervals;
performing channel estimation based on the compensated preamble symbol;
compensating inter carrier interference/inter symbol interference (ICI/ISI) based on at least one of a part of the signaling information and the PN sequence included in the guard intervals; and
detecting the signaling information from the preamble symbol on which the channel estimation and the ICI/ISI compensation are performed and processing the data symbol included in the frame based on the detected signaling information.

17. The method of claim 16, wherein the performing synchronization comprises:
estimating a frequency offset and a sampling offset based on the PN sequence; and
compensating the preamble symbol and performing synchronization based on the estimated frequency offset and sampling offset.

18. The method of claim 16, wherein a guard interval which is inserted in a front end of the preamble symbol comprises the PN sequence, and
wherein a guard interval which is inserted in a back end of the preamble symbol comprises one of the PN sequence and a part of the signaling information.

* * * * *